United States Patent
VanDenberg et al.

(10) Patent No.: US 8,220,809 B2
(45) Date of Patent: Jul. 17, 2012

(54) INDEPENDENT PARALLELOGRAM SUSPENSION SYSTEM

(75) Inventors: Ervin K. VanDenberg, Massillon, OH (US); David H. Croston, Navarre, OH (US)

(73) Assignee: Air Suspensions, Inc., Massillon, OH (US)

( * ) Notice: Subject to any disclaimer, the term of this patent is extended or adjusted under 35 U.S.C. 154(b) by 121 days.

(21) Appl. No.: 12/723,762

(22) Filed: Mar. 15, 2010

(65) Prior Publication Data

US 2010/0264613 A1    Oct. 21, 2010

Related U.S. Application Data

(60) Provisional application No. 61/170,885, filed on Apr. 20, 2009.

(51) Int. Cl.
   *B60G 3/12*    (2006.01)
   *B60G 11/27*   (2006.01)

(52) U.S. Cl. .... 280/124.128; 280/124.153; 280/124.157

(58) Field of Classification Search ........... 280/124.128, 280/124.125, 124.116, 124.153, 124.157
See application file for complete search history.

(56) References Cited

U.S. PATENT DOCUMENTS

| | | | |
|---|---|---|---|
| 3,737,173 A * | 6/1973 | Boissier et al. | 280/684 |
| 4,171,830 A | 10/1979 | Metz | |
| 4,506,910 A | 3/1985 | Bierens | |
| 4,671,531 A * | 6/1987 | Sautter et al. | 280/124.109 |
| 4,840,396 A * | 6/1989 | Kubo | 280/124.143 |
| 4,889,361 A | 12/1989 | Booher | |
| 4,893,832 A | 1/1990 | Booher | |
| 5,366,237 A | 11/1994 | Dilling et al. | |
| 5,505,481 A | 4/1996 | Vandenberg et al. | |
| 5,505,482 A | 4/1996 | Vandenberg | |
| 5,540,454 A | 7/1996 | Vandenberg et al. | |
| 5,683,098 A | 11/1997 | Vandenberg | |
| 5,690,353 A | 11/1997 | Vandenberg | |
| 5,718,445 A | 2/1998 | Vandenberg | |
| 5,788,263 A | 8/1998 | Vandenberg | |
| 5,820,156 A | 10/1998 | Vandenberg | |
| 5,853,183 A | 12/1998 | Vandenberg | |
| 5,865,452 A * | 2/1999 | Chalin | 280/124.125 |
| 5,924,712 A * | 7/1999 | Pierce | 280/124.13 |
| 6,073,946 A * | 6/2000 | Richardson | 280/86.5 |
| 6,796,566 B2 * | 9/2004 | VanDenberg | 280/86.5 |
| 6,871,862 B2 * | 3/2005 | Chalin | 280/86.5 |
| 6,921,098 B2 * | 7/2005 | VanDenberg et al. | 280/124.116 |
| 7,234,713 B1 * | 6/2007 | Vander Kooi et al. | 280/124.106 |
| 7,722,064 B2 * | 5/2010 | Stuart et al. | 280/124.128 |
| 2007/0170685 A1 * | 7/2007 | Chalin et al. | 280/124.157 |
| 2008/0018070 A1 * | 1/2008 | Gottschalk | 280/86.5 |
| 2009/0127812 A1 * | 5/2009 | Copsey et al. | 280/124.128 |

* cited by examiner

*Primary Examiner* — Drew Brown
(74) *Attorney, Agent, or Firm* — Sand & Sebolt

(57) ABSTRACT

A suspension system for use with a frame comprising a first side suspension opposite a second side suspension, the first side suspension having a complete parallelogram suspension proximate the first side, and the second side suspension having a complete parallelogram suspension proximate the second side. The suspension system also includes a cross tube disposed at least partially between the first side and the second side, as well as at least one spring for resiliently controlling the vertical movement of the first and second side suspensions.

28 Claims, 11 Drawing Sheets

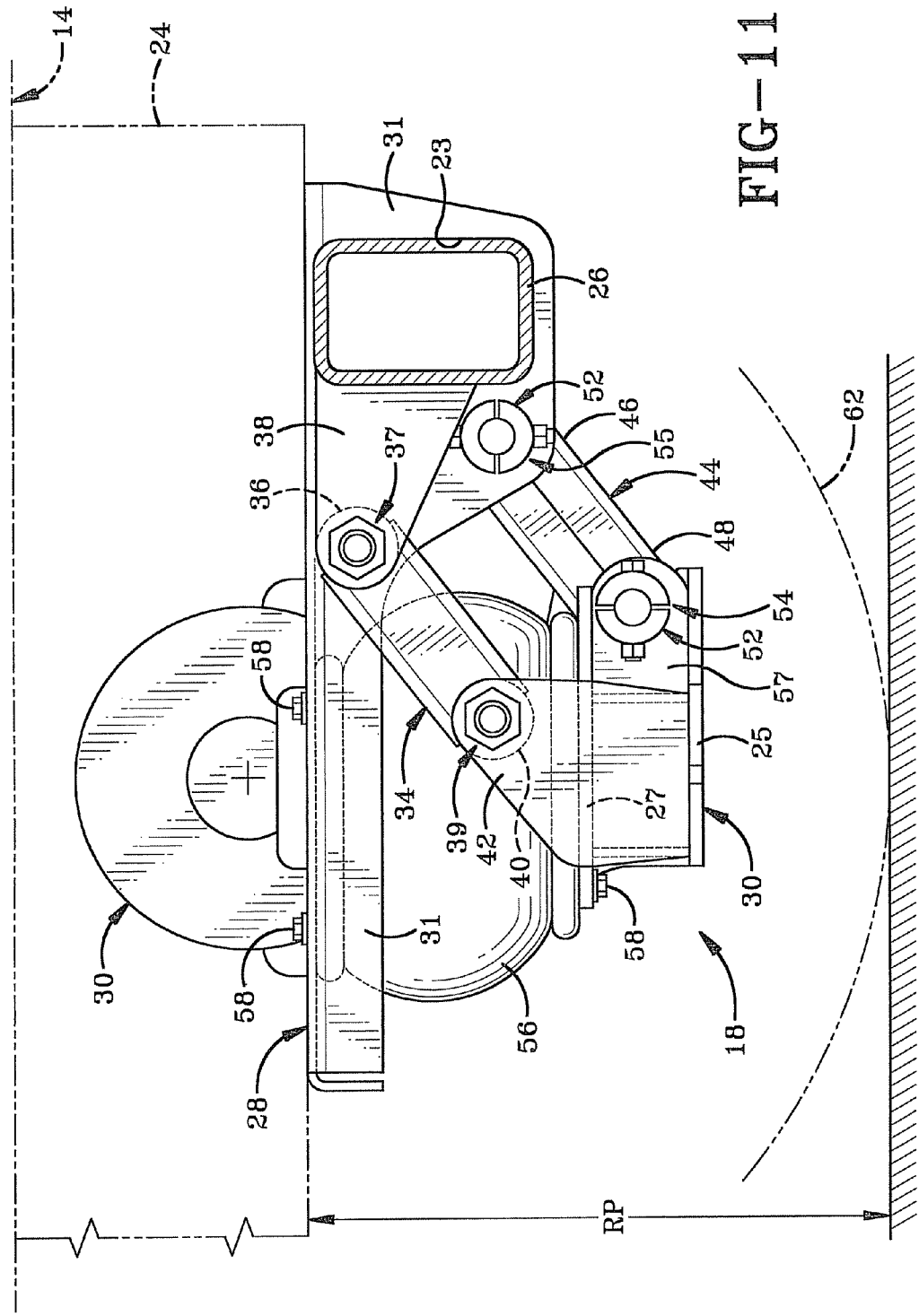

INDEPENDENT PARALLELOGRAM SUSPENSION SYSTEM

CROSS REFERENCE TO RELATED APPLICATION

This application claims priority from U.S. Provisional Patent Application Ser. No. 61/170,885 filed Apr. 20, 2009; the disclosure of which is incorporated herein by reference.

BACKGROUND OF THE INVENTION

1. Technical Field

The invention relates generally to an improved vehicle suspension system. More particularly, the invention relates to air spring suspension systems with parallelogram components for land vehicles. Specifically, the invention relates to a parallelogram style suspension system with an independent, full parallelogram suspension at each wheel.

2. Background Information

Suspensions are available in the prior art which utilize air springs to provide a comfortable ride, even for large over-the-road trucks and other heavy vehicles. The air springs are typically used in industrial vehicle single axle units tandem or multi-axle arrangements of two or more axles which are either driven or non-driven.

One drawback of air spring suspensions is that an air spring is essentially an air inflated bag and requires auxiliary stabilization. An air suspended axle must have separate independent mechanical location and attitude controls and stabilized components or it will not function. Absent stabilization, the air spring will extend to its maximum length or width in the direction of least resistance. Also, uneven transverse load distribution on a vehicle supported on unstable air springs will cause vehicle lean and tip-over.

A significant number of air spring suspensions have been developed which to a greater or lesser extent, control axle location and attitude. A number of suspensions that have been developed are roll rigid, while others are roll flexible, each generally being designed for a specific application. The most common roll rigid configuration is the trailing beam type suspension, most of which use the axle as a torsion rod to provide roll rigidity.

Another type of suspension which has been developed is the parallelogram suspension which is not inherently roll rigid, and does not inherently provide lateral stiffness. Again, ancillary devices such as an anti-roll bar, track bars, or guide mechanisms have been utilized to stabilize typical parallelogram designs. As such, parallelogram type suspensions, even with the ancillary devices attached, were often only suitable for low center of gravity loads, or on specialized vehicles stabilized by other vehicle suspension mechanisms.

Trailing arm suspensions are brake reactive. That is, when the vehicle brakes are applied, the suspension will tend to compress thereby reducing the suspensions effectiveness. Similarly, when the brakes are applied as the vehicle moves in reverse, the suspension will tend to raise up, and pivot about the single trailing arm pivot, again reducing the suspensions effectiveness. Further, most trailing arm suspensions suffer from dock walk such that they move toward or away from the loading dock as the suspension moves up or down with the brakes locked. This movement is caused from air draining off the air springs, or as a result of loads added to or removed from the vehicle, or the temperature changes that occur as the trailer remains parked by the dock. Dock walk occurs, primarily because of rotation of the beam, axle and tire assembly when the brakes are locked. As the suspension travels vertically with the brakes locked it rotates the tires causing the tires to move the vehicle horizontally. If the trailer is positioned adjacent a dock, it causes the trailer to move toward or away from the dock as a result of the movement or rotation about the single pivot point.

Similarly, trailing arm suspensions do not utilize the air springs full capacity as the air spring plates are not parallel in extreme operating positions, again as a result of the trailing arm pivoting about a single pivot point.

Parallelogram suspensions were developed to solve a number of the problems associated with trailing arm type suspensions. However, parallelogram suspensions create problems not present in trailing arm type suspensions. Specifically, parallelogram suspensions are not inherently roll rigid or provide lateral stiffness. Parallelogram suspensions have been found to be a significant advancement over the prior art as they provide a relatively stable, safe, and comfortable ride for all types of loads. Some of these parallelogram suspensions are included in U.S. Pat. Nos. 4,114,923, 4,132,432 and 4,309,045.

Advantages of the parallelogram type air spring suspensions include that the air suspended axle in a parallelogram suspension moves a very short linear distance between the loaded and unloaded positions and has no rotational component to the motion. This reduces the problem of dock walk inherent in trailing arm type suspensions.

Further, the parallelogram stabilized suspension permits the air spring's full-load capacity to be utilized. The top and bottom air spring plates remain substantially parallel throughout the full range of air spring travel whether the vehicle is fully loaded or unloaded. Specifically, when the air spring is mounted on the parallel moving link of the parallelogram it allows the utilization of the air springs full travel and full load capacity. In comparison, in the typical trailing arm design where the air spring travels in an arc and "fans" open stretching the rearmost fibers of the spring while not utilizing even the full travel of the forward part of the air spring.

Parallelogram type suspensions are also typically not brake reactive. That is, they do not dive or raise when brake torque is applied to the suspension system.

The parallelogram suspension inherently provides the above advantages, and also locates the axle relative to the longitudinal axis of the vehicle by controlling the forward and rearward motion of the axle relative to the frame. Moreover, a parallelogram suspension also controls the path which the air spring follows as it operates to take up irregularities in the road surface.

Therefore, a need exists for an air spring suspension which incorporates the benefits of a parallelogram suspension, an independent wheel suspension, and an air ride suspension.

SUMMARY OF THE INVENTION

The present invention broadly comprises a suspension system including a base, a first parallelogram suspension having a first axis, a second parallelogram having a second axis whereby the first axis and the second axis are coaxial, and whereby movement of the first parallelogram suspension does not translate force to the second parallelogram suspension. The first and second parallelogram suspensions maybe mounted to the base and each parallelogram includes a lower connecting arm, in which each lower connecting arm is formed as a box beam.

The present invention also broadly comprises a suspension system including a first side opposite a second side, a first suspension having a complete parallelogram suspension proximate the first side, and a second suspension having a complete parallelogram suspension proximate the second side.

BRIEF DESCRIPTION OF THE DRAWINGS

The preferred embodiment of the invention, illustrative of the best modes in which Applicant has contemplated applying the principles of the invention, is set forth in the following description and is shown in the drawings.

DESCRIPTION OF THE PREFERRED EMBODIMENTS

At the outset, it should be appreciated that like drawing numbers on different drawing views identify identical, or functionally similar, structural elements of the invention. While the present invention is described with respect to what is presently considered to be the preferred embodiments, it is to be understood that the invention as claimed is not limited to the disclosed aspects.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
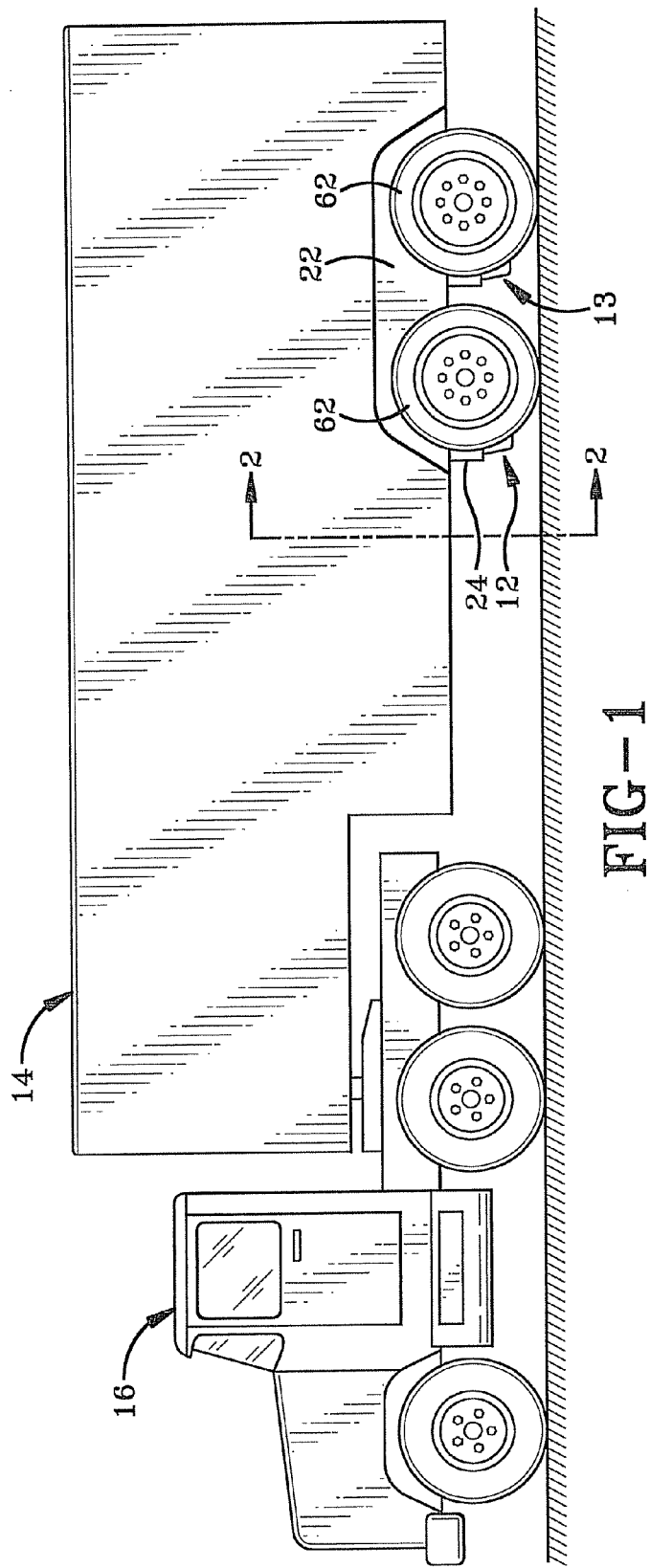
FIG. 1 is a side view of a truck towing a trailer having a preferred embodiment suspension system.
Figure 2:
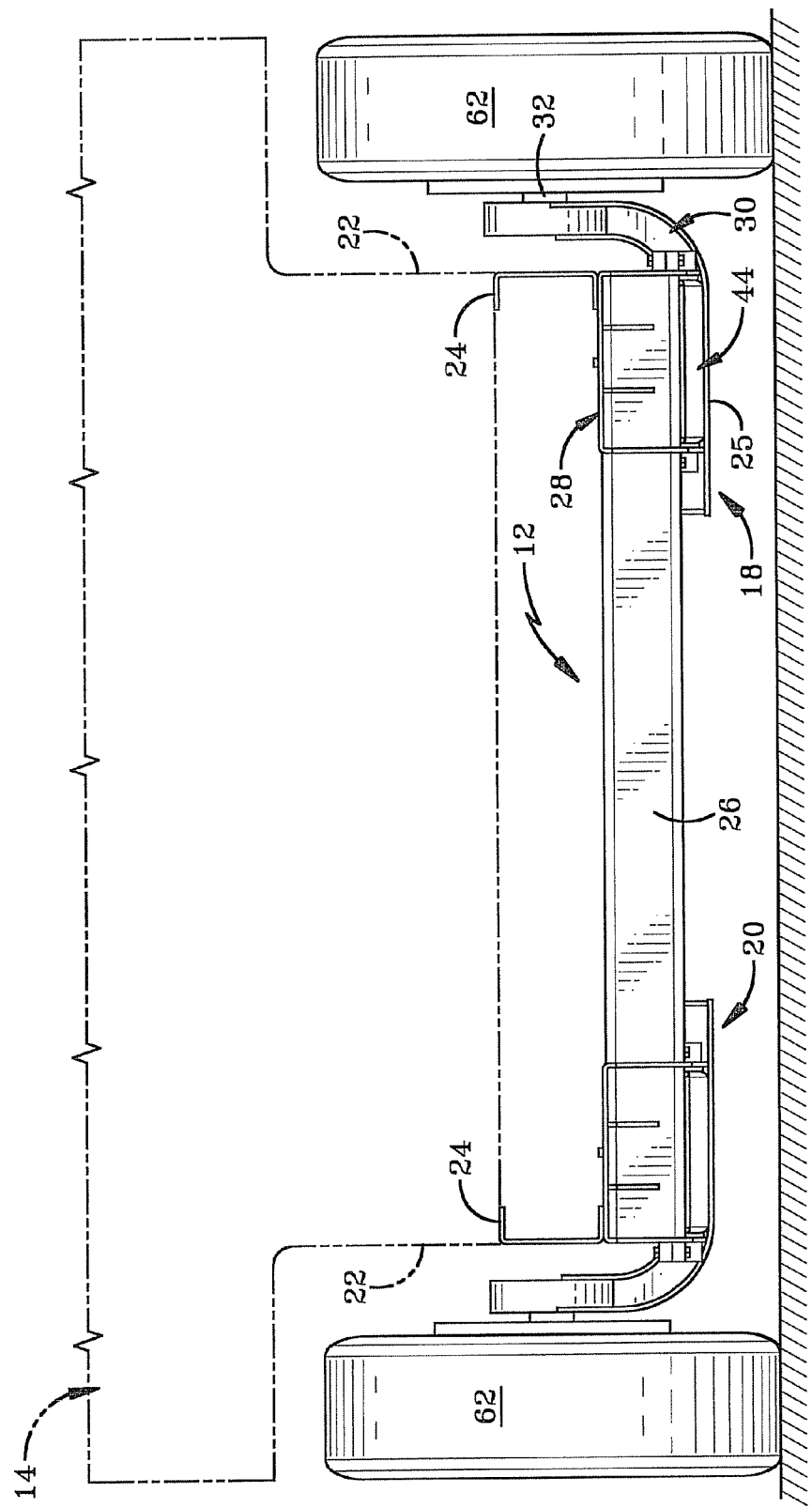
FIG. 2 is a front view of the preferred embodiment suspension system with a trailer body attached to the frame taken generally along line 2-2 of FIG. 1.

The improved vehicle suspension of the present invention is indicated generally at suspension system 12 and rear suspension system 13, as is particularly shown in FIGS. 1 through 11. Inasmuch as both suspension system 12 and rear suspension system 13 are identical being merely located on parallel but offset axes, only suspension system 12 will be described in detail. Averting to FIG. 1, suspension system 12 is shown secured to a trailer body 14 and being pulled by a truck 16. FIG. 2 shows suspension system 12 with a driver side suspension system 18 and a passenger side suspension system 20. Trailer body 14 includes side walls 22 extending upwards and away from suspension system 12, as well as a frame 24 interposing suspension system 12 and body 14. Accordingly, the suspension must be sufficient to support the weight of the frame and the trailer body, as well as absorb shock due to variations in the roadway.

Suspension system 12 includes a cross tube, or bending beam, 26 generally forming the front of suspension system 12 and between driver side suspension system 18 and passenger side system 20. Cross tube 26 is preferably a rectangular tube, but may also be any suitable shape including but not limited to square, cylindrical, triangular, or any parallelepipeds. Inasmuch as both driver side suspension system 18 and passenger side suspension system 20 are identical, except that the passenger side suspension system is opposite of the driver side suspension system, only driver side suspension system 18 will be described in detail. Further, cross tube 26 may extend only partially across the vehicle or the driver side suspension system and the passenger side suspension system could each have their own cross tube without departing from the spirit and scope of the present invention.

Figure 3:
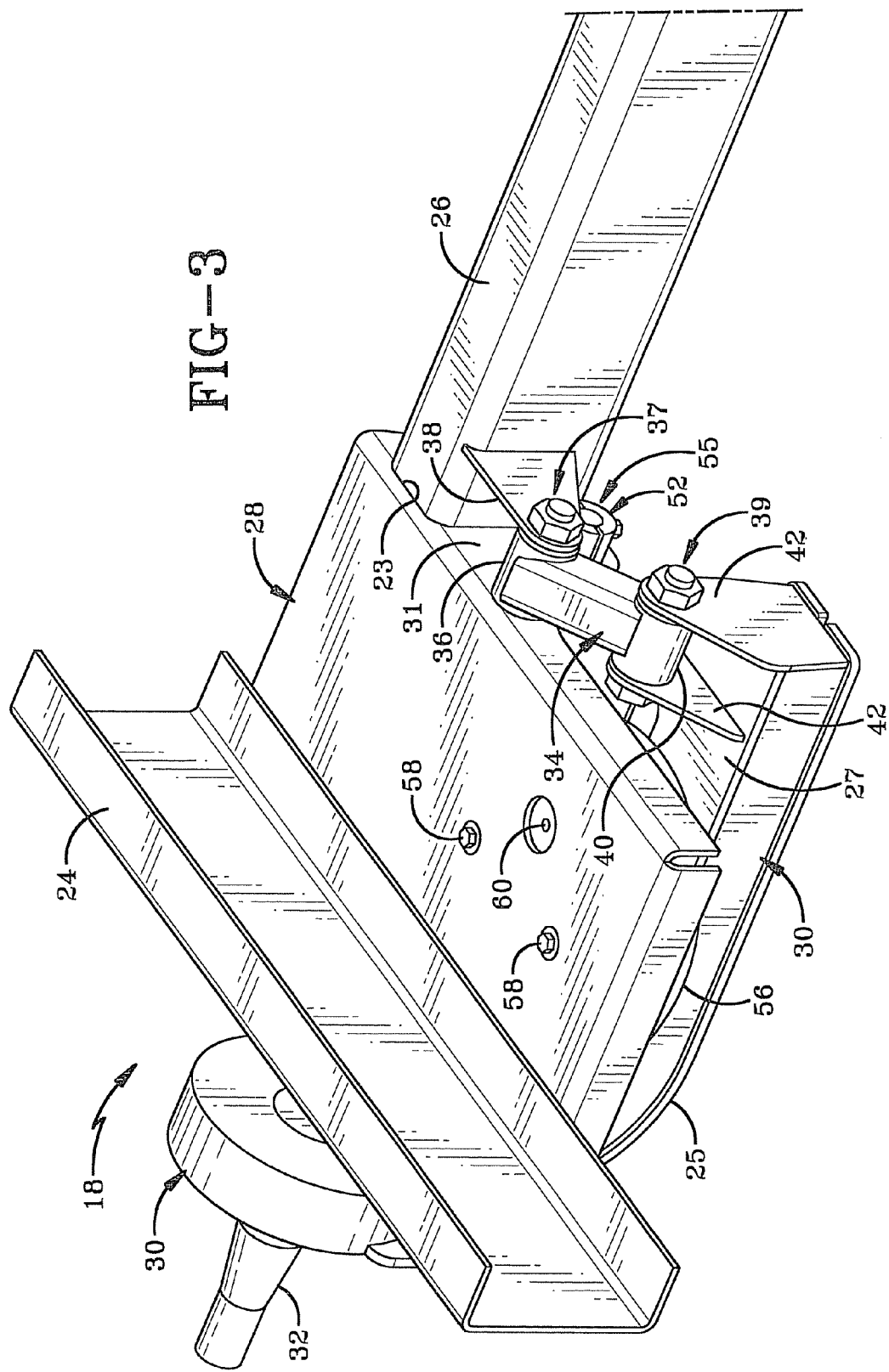
FIG. 3 is a perspective view of the driver side of a preferred embodiment suspension system.

Averting to FIG. 3, which is a perspective view of the driver side suspension system, a mounting support, or base, 28 generally forms the upper portion of the suspension system while a control arm 30 forms the lower and outer portion of the suspension system. Although mounting support 28 forms the upper portion of the suspension system, it is within the spirit and scope of the invention as claimed for the frame or any other suitable stationary member to form the upper portion of the suspension system.

Control arm 30 is preferably arc-like in shape to provide two perpendicular surfaces for forming a lower suspension portion and a mounting location for a tire-wheel assembly 62, although the control arm may be any size or shape suitable for interaction with the suspension system, including a solid bar. Control arm 30 also includes an outer support cover 25 and an inner support cover 27 arranged to provide additional structural integrity to the control arm. Mounting support 28 includes a top surface abutting frame 24, a bottom surface arranged to receive a spring, and two sidewalls 29 (not shown in FIG. 3) and 31 extending perpendicularly downward from the top surface to generally form a hanger bracket. Mounting support 28 has a pair of complimentary shaped openings 23 which are parallel to and share a common axis with one another, but may also have only one opening instead of two. Openings 23 receive and are adjacent to the outer walls of cross tube 26. Further, a spindle 32 extends outward from the outer portion of control arm 30 and is arranged to receive a wheel and brake assembly (not shown).

In accordance with one of the main features of the present invention, an upper connecting arm 34 includes a first end 36 secured to cross tube 26 at a pivot joint 37. The pivot joint connects a pivot bracket 38 and mounting support 28 via a through hole in the side wall of mounting support 28. The upper connecting arm also includes a second end 40 secured to control arm 30 through a pivot joint 39 at mounting tabs 42 integral to and extending away from control arm 30. First and second ends 36 and 40 are preferably arcuate in shape and the central body of upper connecting arm 34 is preferably rectangular, although any suitable shape may be utilized. Pivot joints 37 and 39 include flexible rubber or urethane bushings, or a similarly situated material, to provide rotational control. Upper connecting arm 34 includes a through hole in both first end 36 and second end 40 arranged to accept a bolt.

Figure 4:
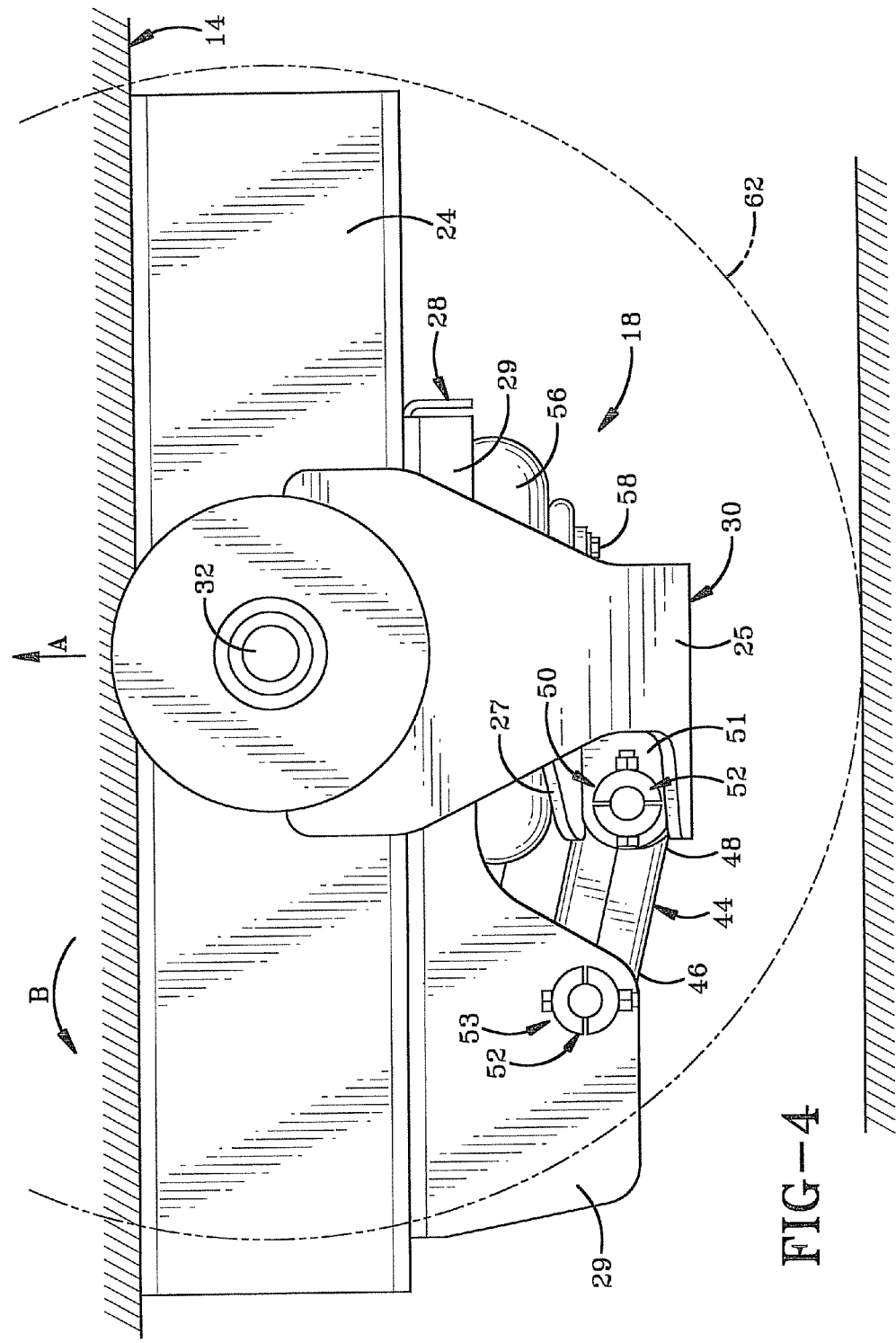
FIG. 4 is a side view of the driver side of a preferred embodiment suspension system with the trailer wheel removed.

In accordance with another of the main features of the invention, FIG. 4 shows a lower connecting arm 44 having a first end 46 secured to mounting support 28 via a through hole in sidewall 29 of mounting support 28. Control arm 30 includes brackets 51 and 57 (FIG. 7) to connect a second end 48 of the lower connecting arm at pivot joints 50 and 54. First and second ends 46 and 48 are preferably arcuate in shape and the central body of lower connecting arm 44 is preferably rectangular. As discussed below in greater detail, the first and second ends of the lower connecting arm are secured to mounting support 28 and control arm 30 with a nut and bolt assembly 52 extending through first end 46 and through second end 48, respectively, in a split tube attachment method. The split tube attachment method incorporates a pair of split tubes with a hole in which a bolt passes. The camber and toe are then adjusted to meet specifications and the split tube is then welded to prevent movement of the split tube assembly.

Similar to upper connecting arm 34, lower connecting arm 44 also includes a through hole in each of first end 46 and second end 48 which may, in contrast to the upper connecting arm, include roller bearings instead of bushings. Due to the increased width of the lower connecting arm, each through hole may have a pressed roller bearing in each end. Further, roller bearings are preferably located at all connection points between lower connecting arm 44 and mounting support 28. Similar to pivot joints 39, the connections between lower connecting arm 44 and control arm 30 may include roller bearings to allow controlled rotational movement of the suspension and full vertical movement of the control arm.

Figure 5:
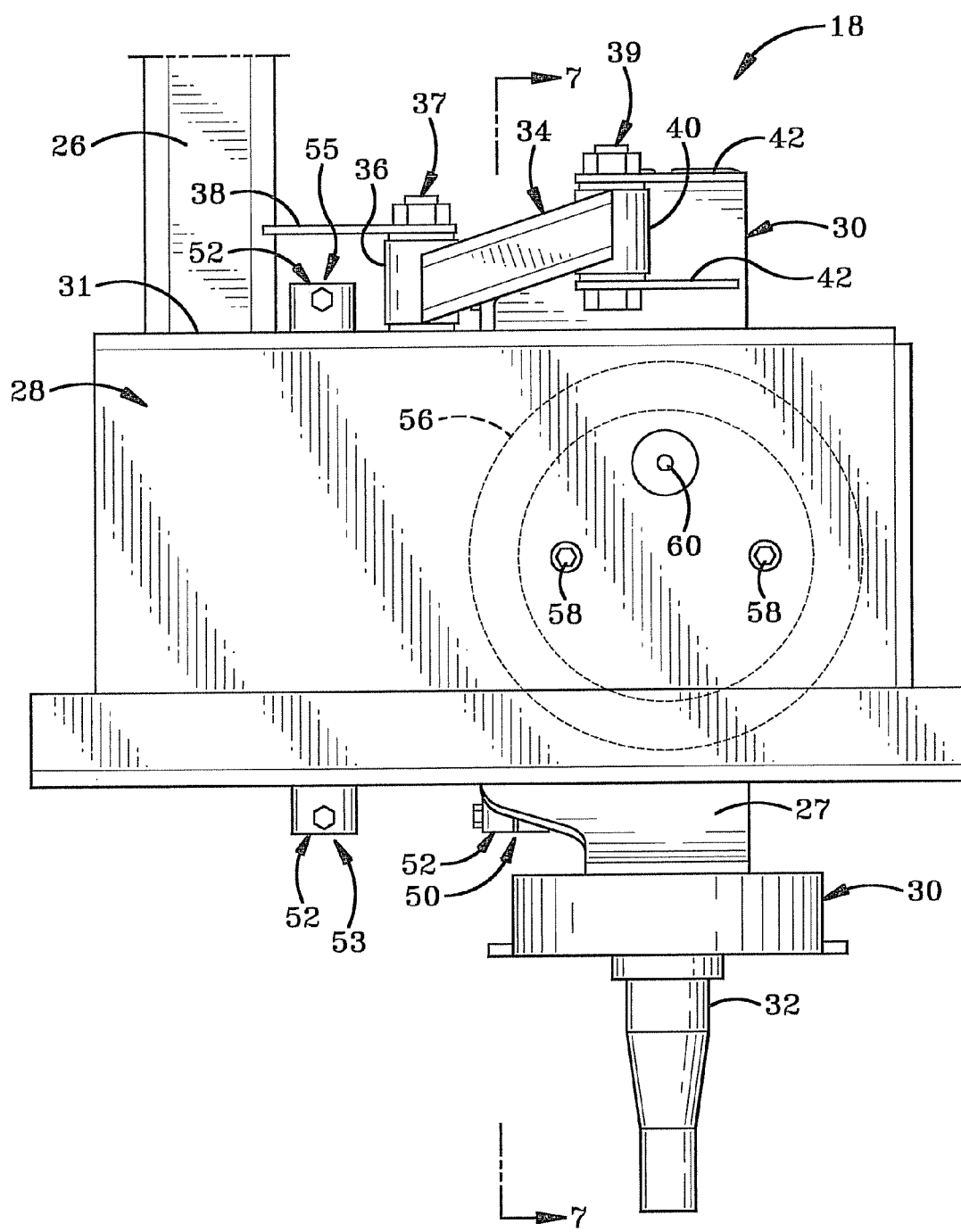
FIG. 5 is a top view of the driver side of a preferred embodiment suspension system.
Figure 6:
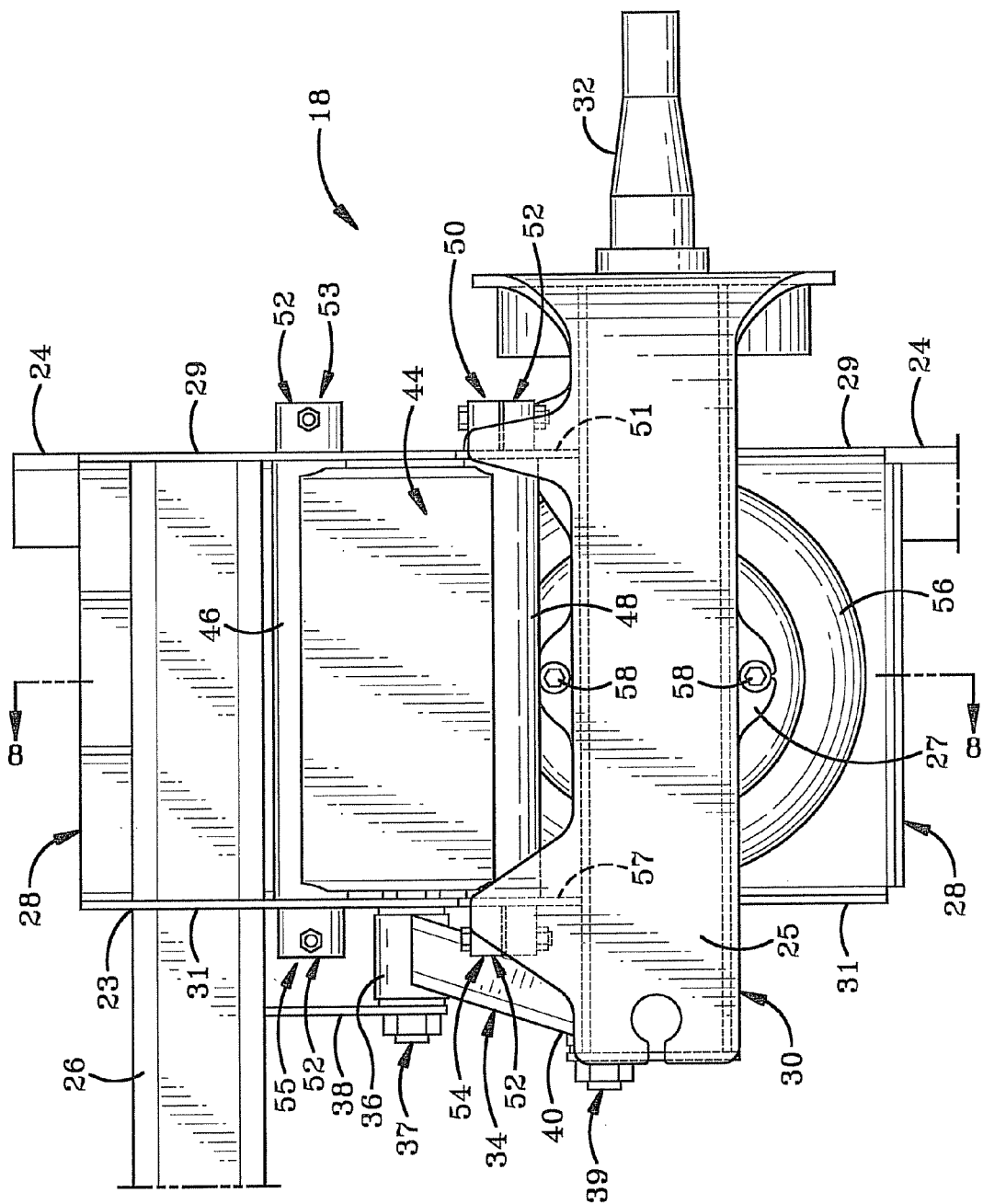
FIG. 6 is a bottom view of the driver side of a preferred embodiment suspension system.

Averting now to FIGS. 5 and 6, first end 46 of lower connecting arm 44 is secured to mounting support 28 in two places, at outer side wall 29 and inner side wall 31 of mounting support 28. Further, the lower connecting arm is approximately the same width as the distance between the sidewalls of mounting support 28 with the addition of a thrust washer of approximately 0.125 inches thick. Lower connecting arm 44 is secured to the mounting support at pivot joints 53 and 55. Second end 48 of lower connecting arm 44 is secured to control arm 30 through outer pivot joint 50 on bracket 51 and inner pivot joint 54 on bracket 57 with nuts and bolts or any other suitable connecter. Similar to the first side, second end 48 is approximately the same width as the distance between pivot brackets 51 and 57.

Accordingly, a full parallelogram suspension is formed at driver side suspension system 18 with mounting support 28 forming the base of the parallelogram, while control arm 30 forms the opposing side of the parallelogram. Upper connecting arm 34 and lower connecting arm 44 form the two remaining parallel sides which are adjacent to the mounting support and control arm. Thus, each side of suspension system 12 incorporates a full parallelogram suspension at each wheel which is independent of the parallelogram suspension at the opposing wheel.

Figure 7:
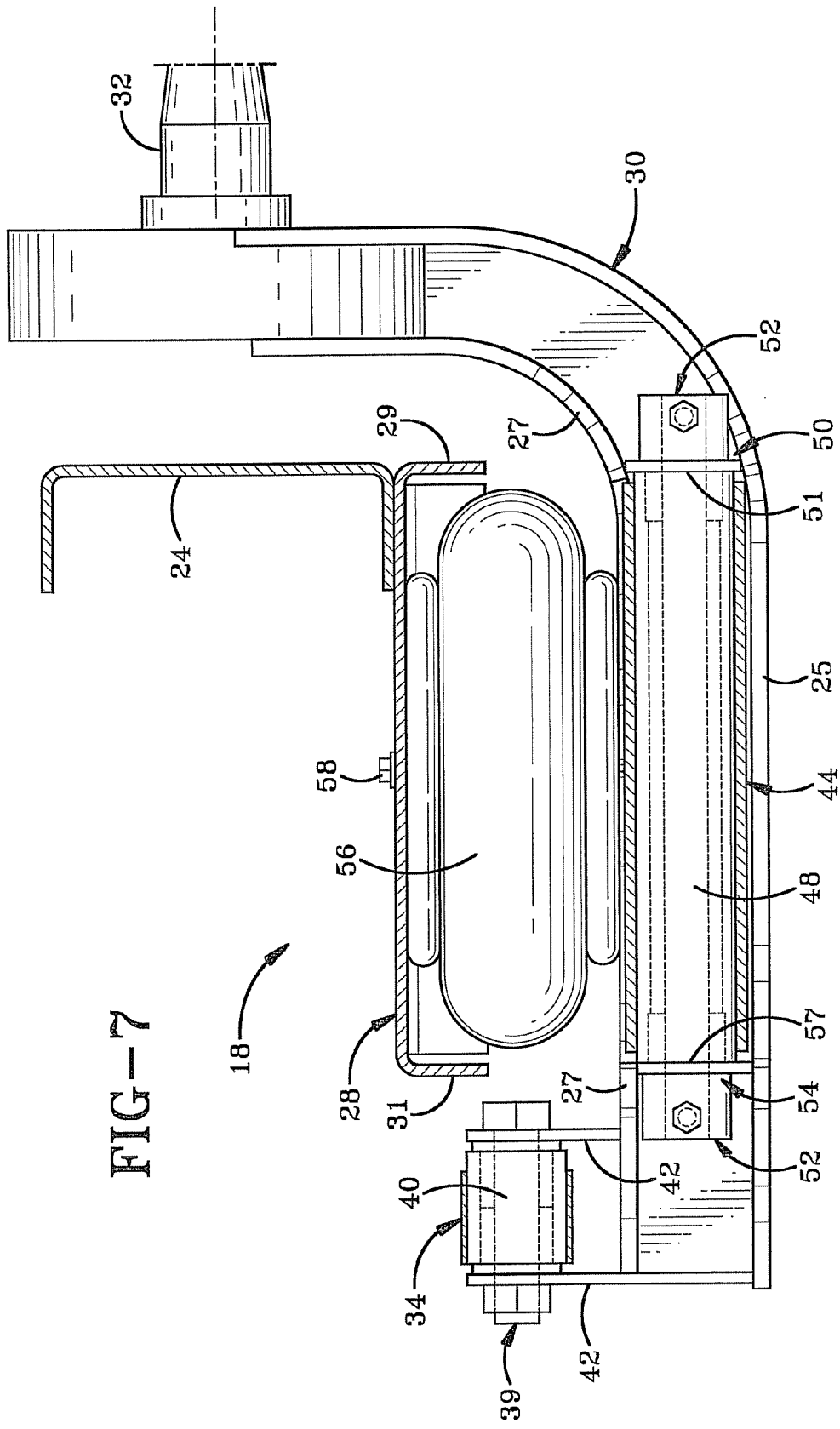
FIG. 7 is a partial cross-sectional view of the driver side of a preferred embodiment suspension system taken generally along line 7-7 of FIG. 5.
Figure 8:
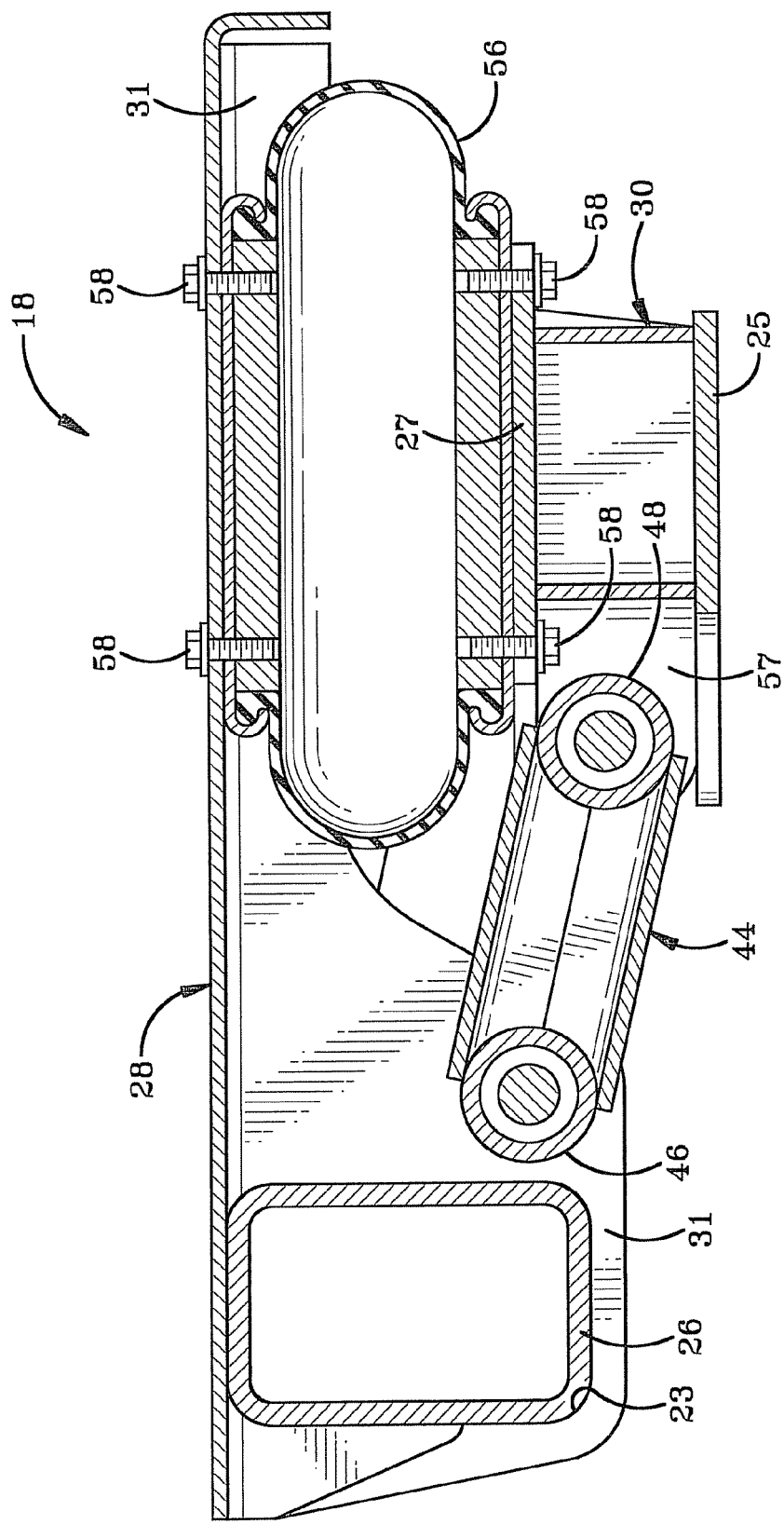
FIG. 8 is a side partial cross-sectional view of the driver side of a preferred embodiment suspension system taken generally along line 8-8 of FIG. 6.

In accordance with another of the main features of the invention, FIGS. 7 and 8 are partial cross-sectional views of driver side suspension system 18 showing an air spring 56. Air spring 56 is intermediate mounting support 28 and control arm 30. In particular, both mounting support 28 and control arm 30 have openings to allow bolts 58 to secure the air spring between the mounting support and the control arm. Air spring 56 also includes an air line inlet 60, as seen in FIGS. 3 and 5, to regulate the air springs dampening characteristics through an air compressor.

As set forth hereinabove, suspension system 12 has been described in detail. As should be apparent to one of ordinary skill in the art, suspension system 12 may be utilized when only a single axle suspension system is required. However, if tandem axle arrangements are required, for example those arrangements utilized on known trailer vehicles, suspension system 12 is utilized in combination with rear suspension system 13 as shown specifically in FIG. 1. Rear suspension system 13 is arranged in the same manner and orientation as suspension system 12.

In a preferred embodiment, when trailer body 14 traverses an irregularity in the road, the force from the irregularity will cause tire-wheel assembly 62 to raise toward trailer body 14. As tire-wheel assembly 62 raises, the parallelogram suspension at that tire-wheel assembly will pivot upwardly. Taking driver side suspension system 18 for example in FIG. 4, vertical movement of spindle 32 in the direction indicated by arrow A translates into rotational movement at the pivot joints and particularly upper connecting arm 34 and lower connecting arm 44 in the direction indicated by arrow B.

Rotational movement also creates an axial movement in control arm 30 generally along the compression axis of air spring 56 in the direction indicated by arrow A (FIG. 4). The rotational movement of the suspension system is resisted by air spring 56 which acts to dampen the resulting vertical movement of control arm 30. Since the rotational movement of the parallelogram suspension is confined to each individual tire-wheel assembly 62, passenger side suspension system 20 is not affected and is capable of full independent travel.

Figure 9:
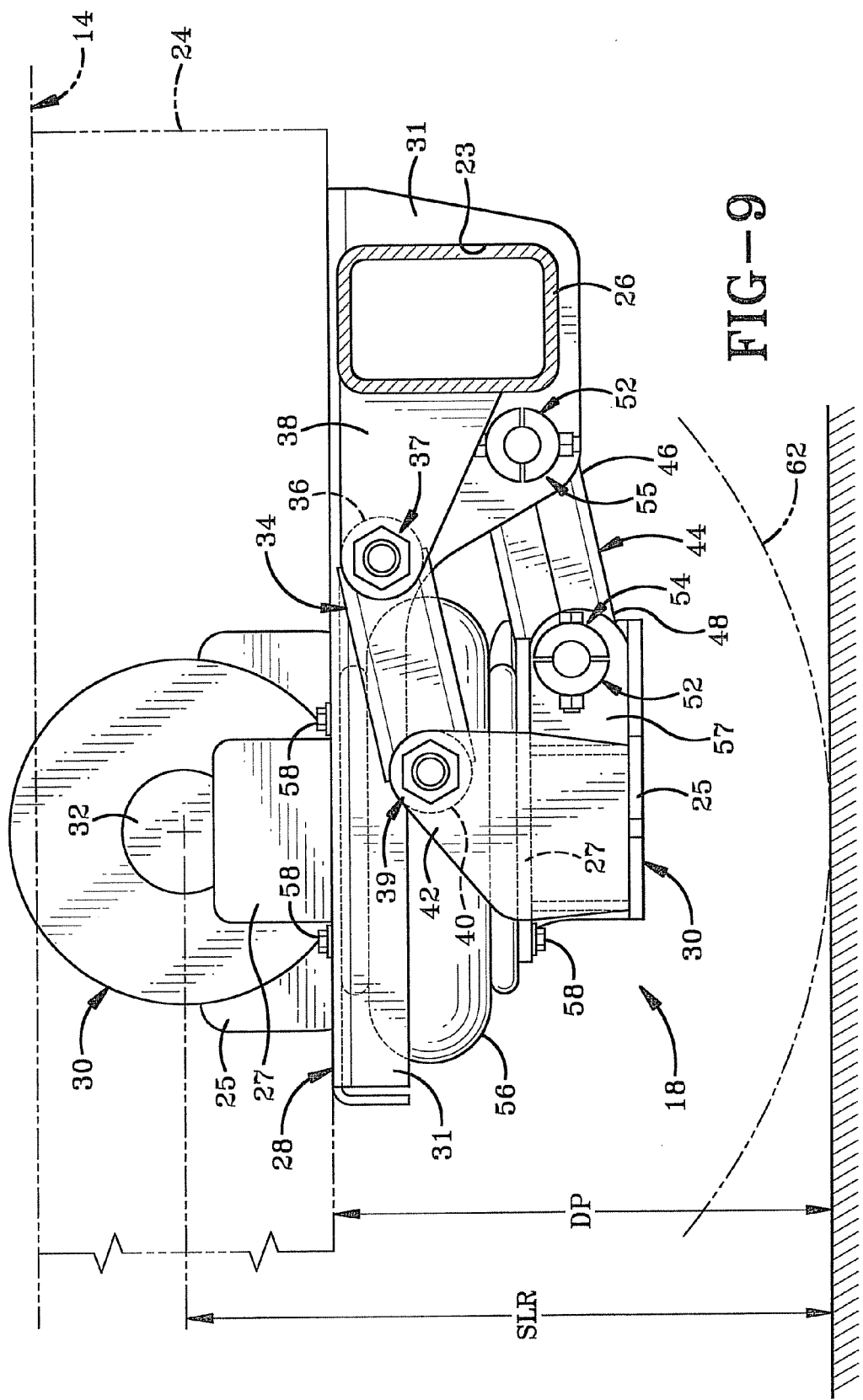
FIG. 9 is a partial side cross-sectional view of the driver side of a preferred embodiment suspension system in the design position viewed from a point between the driver and passenger sides.

Referring to FIG. 9, driver side suspension system 18 of the present invention is shown with air spring 56 in the design position, which may occur when the air springs are inflated for travel and trailer body 14 is loaded with cargo. The distance between spindle 32 and the ground is represented by distance SLR and is preferably 14.3 inches in the design position, jounce (see infra), and rebound (see infra) when a 17.5 inch tire is used, although a 22.5 inches tire or any other size tire is within the spirit and scope of the present invention as claimed. Outer cover support 25 is approximately 5.1 inches from the ground, while distance DP represents the distance between the ground and mounting support 28, which is approximately 13.5 inches in the preferred embodiment.

Figure 10:
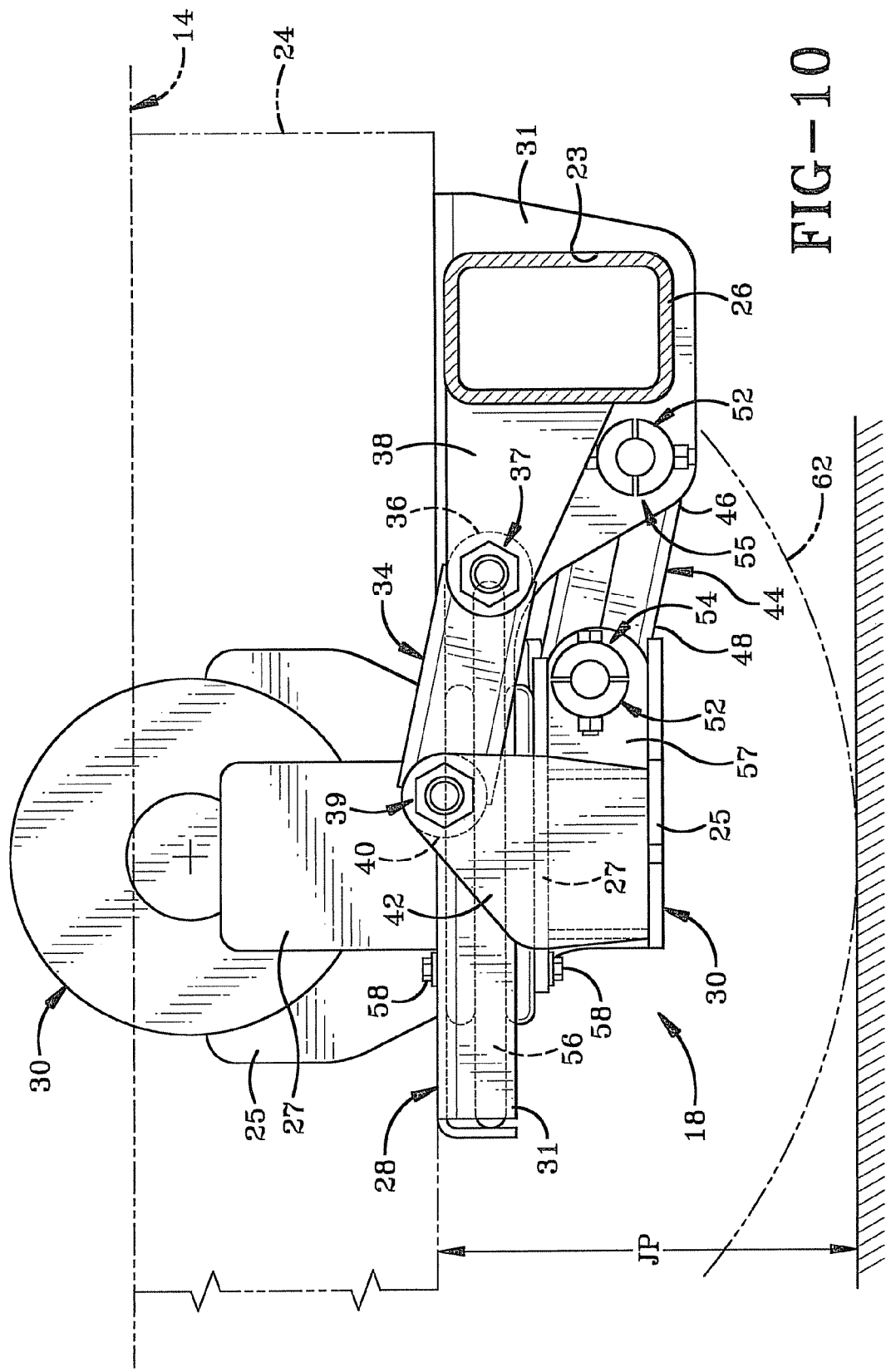
FIG. 10 is a partial side cross-sectional view of the driver side of a preferred embodiment suspension system in the jounce position viewed from a point between the driver and passenger sides; and, FIG. 11 is a partial side cross-sectional view of the driver side of a preferred embodiment suspension system in the rebound position viewed from a point between the driver and passenger sides.

FIG. 10 is driver side suspension system 18 shown in the jounce, or compressed, position when the air is exhausted from air spring 56. As previously noted, the distance between spindle 32 and the ground is still approximately 14.3 inches in the jounce position. In this position, the distance between outer cover support 25 and the ground is approximately 5.1 inches, while distance JP is approximately 11 inches.

FIG. 11 is driver side suspension system 18 shown in the rebound position with the suspension fully extended in the vertical direction. The distance between spindle 32 and the ground again remains approximately 14.3 inches in the rebound position. In this position, the distance between outer cover support 25 and the ground is approximately 5.1 inches, while distance RP is approximately 15.9 inches. Further, in a preferred embodiment, the spindle has a vertical travel of approximately 4.9 inches and a horizontal travel of approximately 1.1 inches.

As can be seen in FIGS. 9 through 11, control arm 30 shares a common axis with air spring 56. In particular, since air spring 56 is secured directly between control arm 30 and mounting support 28, the air spring and control arm share the same horizontal axis. Advantageously, this arrangement allows full use of air spring 56 without any fanning of the air spring due to the minimal amount of off-center loading. In particular, since the control arm and air spring share a common axis, all movement of control arm 30 is equally imposed on air spring 56. Accordingly, the spring rate of air spring 56 can be reduced to approximately one-fourth of a traditional parallelogram suspension spring rate and provide a remarkably better ride quality.

In summary, suspension system 12 provides a parallelogram suspension with all the advantages known in the art, while still providing an independent wheel action. Driver side suspension system 18 operates such that as tire-wheel assembly 62 moves, control arm 30 moves vertically and upper connecting arm 34 and lower connecting arm 44 pivot in unison to maintain a constant angle throughout the path of travel. Similarly, inasmuch as suspension system 18 incorporates a full parallelogram suspension at each tire-wheel assembly 62, forces encountered at driver side suspension system 18 are absorbed by air spring 56 and are not transferred to the tire-wheel assembly at passenger side suspension system 20. Thus, suspension system 12 enhances the ride quality and damping characteristics of the suspension system by isolating each parallelogram suspension from one another.

Accordingly, the suspension system is an effective, safe, inexpensive, and efficient device that achieves all the objectives of the invention, provides for eliminating difficulties encountered with prior art devices, and systems, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the suspension system is constructed and used, the characteristics of the construction, and the advantageous new and useful results obtained; the new and useful structures, devices, elements, arrangement, parts, combinations, and methods are set forth in the appended claims.

What is claimed is:

1. A vehicle suspension system comprising:
   a first parallelogram suspension having a first axis;
   a second parallelogram suspension having a second axis coaxial with the first axis;
   a first air spring positioned to resiliently control vertical movement of the first parallelogram suspension;
   a second air spring positioned to resiliently control vertical movement of the second parallelogram suspension; and
   whereby movement of the first parallelogram suspension does not translate force to the second parallelogram suspension.

2. The suspension system of claim 1 wherein the first parallelogram suspension comprises a control arm; and the first air spring and control arm share a horizontal common axis.

3. The suspension system of claim 1 wherein
   the first parallelogram suspension comprises a first base, a first control arm, a first connecting arm, a second connecting arm, a first pivot joint, a second pivot joint, a third pivot joint and a fourth pivot joint;
   the second parallelogram suspension comprises a second base, a second control arm, a third connecting arm, a fourth connecting arm, a fifth pivot joint, a sixth pivot joint, a seventh pivot joint and an eighth pivot joint;
   the first connecting arm is pivotally connected to the first base at the first pivot joint and pivotally connected to the first control arm at the second pivot joint;
   the second connecting arm is pivotally connected to the first base at the third pivot joint and pivotally connected to the first control arm at the fourth pivot joint;
   the third connecting arm is pivotally connected to the second base at the fifth pivot joint and pivotally connected to the second control arm at the sixth pivot joint;
   the fourth connecting arm is pivotally connected to the second base at the seventh pivot joint and pivotally connected to the second control arm at the eighth pivot joint;
   the first air spring extends between the first base and the first control arm; and
   the second air spring extends between the second base and the second control arm.

4. The suspension system of claim 1 further comprising a vehicle frame;
   wherein each of the parallelogram suspensions comprises a base which is fixedly secured to the vehicle frame, a control arm, a first connecting arm and a second connecting arm.

5. A vehicle suspension system comprising:
   a first parallelogram suspension having a first axis;
   a second parallelogram suspension having a second axis coaxial with the first axis;
   whereby movement of the first parallelogram suspension does not translate force to the second parallelogram suspension; and
   in which each parallelogram suspension includes a lower connecting arm having a first end and a second end, and in which each lower connecting arm is formed as a box beam.

6. The suspension system as defined in claim 5 in which at least one roller bearing is mounted to one of the first and second ends of each lower connecting arm.

7. The suspension system as defined in claim 5 further comprising:
   an air spring; and
   in which at least one end of the lower connecting arm is maintained below the air spring.

8. The suspension system as defined in claim 5 in which each box beam has a length in the range of from 6 to 14 inches in length.

9. The suspension system as defined in claim 8 in which each box beam has a smooth bottom surface.

10. The suspension system as defined in claim 8 in which the first parallelogram suspension comprises a base which includes a pair of spaced apart hanger brackets adjacent each lower connecting arm, and in which the lower connecting arm is of a length substantially equal to the distance between the hanger brackets.

11. The suspension system as defined in claim 5 in which each parallelogram suspension includes an upper connecting arm.

12. The suspension system as defined in claim 11 in which each upper connecting arm is substantially smaller than the lower connecting arm, and in which the upper connecting arm is offset relative to the lower connecting arm.

13. A vehicle suspension system comprising:
   a first parallelogram suspension having a first axis;
   a second parallelogram having a second axis coaxial with the first axis;
   whereby movement of the first parallelogram suspension does not translate force to the second parallelogram suspension; and
   a bending beam whereby bending forces created by the first and second parallelogram suspensions are taken entirely by the bending beam.

14. The suspension system as defined in claim 13 in which the bending beam is a cross tube extending intermediate the first and second parallelogram suspensions.

15. The suspension system as defined in claim 14 in which the cross tube extends in front of and between the first and second suspensions.

16. The suspension system as defined in claim 15 further comprising:
a spindle having a central axis wherein the spindle is adapted for receiving a tire-wheel assembly;
an air spring; and
wherein the spindle axis passes through the air spring.

17. The suspension system as defined in claim 16 in which the spindle has a path of travel, and in which the path of travel is substantially vertical through out the path of travel.

18. The suspension system as defined in claim 17 in which each parallelogram includes an air spring, and in which the air spring is utilized without fanning.

19. The suspension system as defined in claim 17 in which the spindle travels horizontally a distance in the range of from 0 to 2 inches.

20. The suspension system as defined in claim 17 in which the first and second parallelogram suspensions have a length in the range of from 18 to 28 inches.

21. The suspension system as defined in claim 14 in which the cross tube forms at least a portion of the first parallelogram suspension and at least a portion of the second parallelogram suspension.

22. The suspension system as defined in claim 12 wherein each parallelogram suspension comprises a base; and further comprising:
a first end and a second end formed on each upper connecting arm;
a control arm extending intermediate each of the lower connecting arm first ends and the upper connecting arm first ends and connected thereto at respective connection points, and whereby the lower connecting arm second ends and the upper connecting arm second ends are each connected to the respective base at respective connection points;
a first air spring positioned below the base of the first parallelogram suspension for resiliently controlling the vertical movement of the first parallelogram suspension; and,
a second air spring positioned below the base of the second parallelogram suspension for resiliently controlling the vertical movement of the second parallelogram suspension.

23. The suspension system as defined in claim 22 in which the first spring is disposed between the base and the control arm of the first parallelogram suspension and the second spring is disposed between the base and the control arm of the second parallelogram suspension.

24. The suspension system as defined in claim 23 in which all of the connection points are pivots.

25. A suspension system comprising:
a first side opposite a second side;
a first suspension having a complete parallelogram suspension proximate the first side;
a second suspension having a complete parallelogram suspension proximate the second side;
a first air spring positioned to resiliently control vertical movement of the first parallelogram suspension; and
a second air spring positioned to resiliently control vertical movement of the second parallelogram suspension.

26. The suspension system of claim 25 wherein the first parallelogram suspension comprises a control arm; and the first air spring and control arm share a horizontal common axis.

27. The suspension system of claim 25 wherein
the first parallelogram suspension comprises a first base, a first control arm, a first connecting arm, a second connecting arm, a first pivot joint, a second pivot joint, a third pivot joint and a fourth pivot joint;
the second parallelogram suspension comprises a second base, a second control arm, a third connecting arm, a fourth connecting arm, a fifth pivot joint, a sixth pivot joint, a seventh pivot joint and an eighth pivot joint;
the first connecting arm is pivotally connected to the first base at the first pivot joint and pivotally connected to the first control arm at the second pivot joint;
the second connecting arm is pivotally connected to the first base at the third pivot joint and pivotally connected to the first control arm at the fourth pivot joint;
the third connecting arm is pivotally connected to the second base at the fifth pivot joint and pivotally connected to the second control arm at the sixth pivot joint;
the fourth connecting arm is pivotally connected to the second base at the seventh pivot joint and pivotally connected to the second control arm at the eighth pivot joint;
the first air spring extends between the first base and the first control arm; and
the second air spring extends between the second base and the second control arm.

28. The suspension system of claim 25 further comprising a vehicle frame;
wherein each of the parallelogram suspensions comprises a base which is fixedly secured to the vehicle frame, a control arm, a first connecting arm and a second connecting arm.

* * * * *